United States Patent [19]

Takahashi

[11] 4,142,080
[45] Feb. 27, 1979

[54] FOOT-OPERATED CONTROLLER ASSEMBLY

[75] Inventor: Naoyuki Takahashi, Hino, Japan

[73] Assignee: Olympus Optical Company Limited, Tokyo, Japan

[21] Appl. No.: 790,842

[22] Filed: Apr. 25, 1977

[30] Foreign Application Priority Data

Jun. 22, 1976 [JP] Japan ............................ 51/82043[U]

[51] Int. Cl.² ............................................ H01H 13/16
[52] U.S. Cl. .............................. 200/86.5; 200/153 C; 200/307
[58] Field of Search ............... 200/86.5, 153 C, 153 T, 200/159 R, 52 R, 340, 307, 18, 6 A, 5 C, 5 E

[56] References Cited

U.S. PATENT DOCUMENTS

| 3,159,365 | 12/1964 | Watson | 200/307 |
| 3,511,951 | 5/1970 | Miller | 200/5 C |
| 3,637,964 | 1/1972 | Ivko | 200/86.5 |
| 3,980,848 | 9/1976 | Shulz | 200/86.5 |

Primary Examiner—Gerald P. Tolin
Attorney, Agent, or Firm—Lerner, David, Littenberg & Samuel

[57] ABSTRACT

A plurality of foot-operated controllers are separately provided for controlling various operations such as the vertical movement of the body of a surgical microscope, the focussing of an objective or the like. Depending on the intended use, selected controllers are connected together by releasable spacers to provide a foot-operated controller assembly.

2 Claims, 4 Drawing Figures

FOOT-OPERATED CONTROLLER ASSEMBLY

BACKGROUND OF THE INVENTION

The invention relates to a foot-operated controller assembly which may be used to operate a surgical microscope.

A surgical microscope is used to enable an affected part to be treated to be viewed on a magnified scale for the purpose of a surgical procedure. During the surgical operation, both hands are unavailable to operate the microscope, which therefore must be operated by interrupting the surgical operation. To avoid this drawback, a surgical microscope is designed so that it is automatically operated by electrical means. However, it still requires the depression of electrical switch buttons to start or stop the operation of the microscope. In this end, a controller is already known which includes foot-operated switches. A surgical microscope is usually provided with a number of mechanisms including a mechanism for vertically moving the microscope body, an objective focussing mechanism, switches for turning a variety of lights on and off, a magnification changing mechanism where the objective is a zoom lens, and the like. It will be appreciated that the switches which are required to activate these mechanisms will total to an increased number, and if they are all incorporated into a foot-operated controller, the latter will become quite bulky. In addition, the presence of switches which are not used during a particular operation may cause an inadvertent operation of the switches.

SUMMARY OF THE INVENTION

It is an object of the invention to provide a foot-operated controller assembly of a high practical utility which avoids the bulkiness and the likelihood of inadvertent operation of the prior art by providing a plurality of separate foot-operated controllers which are selectively connected together by releasable spacers.

DETAILED DESCRIPTION OF EMBODIMENTS

Figure 1:
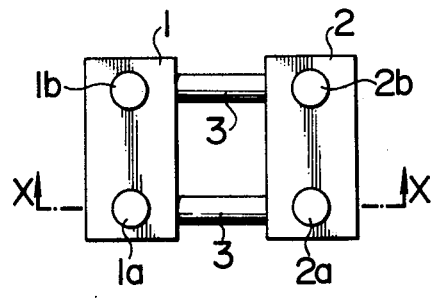
FIG. 1 is a plan view of a foot-operated controller assembly constructed in accordance with one embodiment of the invention.
Figure 2:
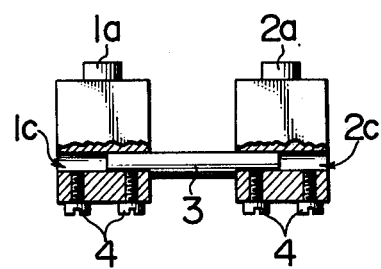
FIG. 2 is a side elevation, partly in section, of the assembly shown in FIG. 1, the section being taken along the line X—X shown in FIG. 1.
Figure 3:
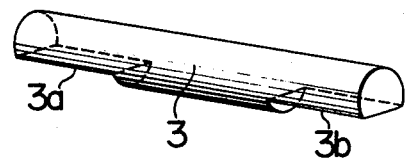
FIG. 3 is a perspective view of a spacer.
Figure 4:
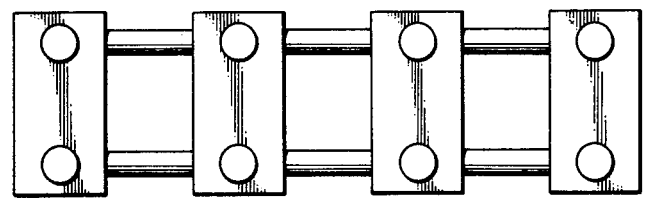
FIG. 4 is a plan view of another controller assembly.

Referring to FIGS. 1 and 2, there is shown an assembly comprising a pair of controllers which are integrally connected together. A controller 1 may be used to move a microscope body in the vertical direction, and can be operated by depressing switch buttons 1a, 1b with the foot. Another controller 2 may be used to focus the objective of the microscope, for example, and can be similarly operated by depressing switch buttons 2a, 2b with the foot. The controllers 1, 2 are mechanically connected together by a spacer 3, which is configured as illustrated in FIG. 3. As will be seen from FIG. 2, the respective controllers 1, 2 are formed with through openings 1c, 2c, into which the opposite ends 3a, 3b of the spacer 3 are inserted and integrally clamped by fixing screws 4. The ends 3a, and 3b are of reduced dimensions and conform to the shape of opening 1c and 2c, for example, the intermediate portions of the fasteners act as spacers between the controllers 1 and 2. While the embodiment includes only two controllers, more controllers may be integrally connected together by spacers, as shown in FIG. 4. The controllers each house switches operated by the buttons 1a, 1b, 2a, etc. The switches are electrically connected to the apparatus being controlled by electrical leads, not shown for purposes of simplicity.

In accordance with the invention, only those controllers which are required during a particular surgical operation are integrally connected together to provide a controller assembly, which is therefore compact in size and avoids the likelihood of inadvertent operation as might occur with a bulky controller housing all of the switches which may be required in one surgical operation or another. The position of individual controllers in the array can be changed at will by a user. The individual spacers may have different lengths so that the spacing between adjacent controllers can be varied. It is to be noted that each of the controllers can be used alone, without being connected with another controller.

What is claimed is:

1. A foot-operated controller assembly for use with a surgical microscope or similar device, comprising a plurality of separate foot-operated controllers, each including an electrical switch mechanism for controlling an operation of said microscope or similar device, said controllers being selectably connected together by one or more elongated spacer members, said controllers each having at least one opening receiving said one or more spacer members, and said controllers each having fasteners securing said spacer members within said openings.

2. The apparatus of claim 1, wherein said spacer members are provided with ends of reduced dimension, said controller openings conforming to the shape of said spacer member ends, and said fasteners comprising threaded screws.

* * * * *